United States Patent [19]

Hekstra et al.

[11] Patent Number: 5,410,307

[45] Date of Patent: Apr. 25, 1995

[54] SYSTEM COMPRISING AT LEAST ONE ENCODER FOR CODING A DIGITAL SIGNAL AND AT LEAST ONE DECODER FOR DECODING A CODED DIGITAL SIGNAL, AND ENCODER AND DECODER FOR USE IN THE SYSTEM

[75] Inventors: Andries P. Hekstra, Woubrugge; Arian Koster, Mydrecht; Dolf A. Schinkel, Hillegom, all of Netherlands

[73] Assignee: Koninklijke PTT Nederland N.V., Netherlands

[21] Appl. No.: 120,122

[22] Filed: Sep. 10, 1993

[30] Foreign Application Priority Data

Sep. 14, 1992 [NL] Netherlands ............ 9201594

[51] Int. Cl.⁶ ................. H03M 1/00; H04N 7/13
[52] U.S. Cl. ................. 341/50; 348/412; 341/76
[58] Field of Search ........ 341/50, 51, 67, 76; 348/400–402, 409, 410, 411–413, 415, 416

[56] References Cited

U.S. PATENT DOCUMENTS

| | | | |
|---|---|---|---|
| 4,518,950 | 5/1985 | Petr | 341/76 |
| 4,549,304 | 10/1985 | Weirich et al. | 375/27 |
| 4,999,705 | 3/1991 | Puri | 348/412 |
| 5,063,443 | 11/1991 | Okajima et al. | 348/411 |
| 5,173,773 | 12/1992 | Ueda et al. | 348/412 |

Primary Examiner—Marc S. Hoff
Attorney, Agent, or Firm—Peter L. Michaelson

[57] ABSTRACT

Known systems based on layered video coding and video decoding code with inadequate efficiency because a new high-resolution picture is predicted by means of switching means present in the system either on a basis of the preceding high-resolution picture or on the basis of an instantaneous low-resolution picture. According to the invention, designing the switching means for a adjustment of a ratio of the signal representing a preceding high-resolution picture and the signal representing the instantaneous low-resolution picture and for then adding both adjusted signals achieves a gain of 3 dB in the prediction with the correct ratio, thus resulting in an improvement in the coding efficiency.

15 Claims, 2 Drawing Sheets

SYSTEM COMPRISING AT LEAST ONE ENCODER FOR CODING A DIGITAL SIGNAL AND AT LEAST ONE DECODER FOR DECODING A CODED DIGITAL SIGNAL, AND ENCODER AND DECODER FOR USE IN THE SYSTEM

A. BACKGROUND OF THE INVENTION

The invention relates to a system comprising at least one encoder for coding a digital signal and at least one decoder for decoding a coded digital signal, which encoder is provided with an input for receiving the digital signal, first data processing means, coupled to the input, for generating a first coded digital signal, first encoder feedback means for feeding back at least a section of the first data processing means, which first encoder feedback means comprise encoder switching means, of which a main contact is coupled to the input and of which a first switch contact is coupled to the first data processing means via first encoder memory means, reduction means, coupled to the input, for reducing the received digital signal, second data processing means, coupled to the reduction means, for generating a second coded digital signal, and second encoder feedback means for feeding back at least a section of the second data processing means, which second encoder feedback means comprise second encoder memory means and are coupled to a second switch contact of the encoder switching means via encoder prediction means, and which decoder is provided with first data reprocessing means for processing a first coded digital signal, first decoder memory means which are coupled to a first switch contact of decoder switching means, of which a main contact is coupled to the first data reprocessing means, second data reprocessing means for processing a second coded digital signal, and second decoder memory means which are coupled to the second data reprocessing means and, via decoder prediction means, to a second switch contact of the decoder switching means.

Such a system is disclosed in "Coded representation of picture and audio information", "TM1 Compatibility Experiments" by I. Parke, ISO-IEC/JTC1/SC29/WG11, MPEG92/291, in particular FIG. 1 (the encoder) and FIG. 2 (the decoder) thereof. The encoder, which is based on layered coding, comprises the input for receiving the digital signal to be coded, such as, for example, a television signal made up of picture elements (pixels or pels), and the first data processing means, coupled to the input, for generating the first coded digital signal. Furthermore, the encoder comprises the first encoder feedback means for feeding back at least a section of the first data processing means in order to make the coding proceed more efficiently. The first encoder feedback means comprise the encoder switching means, of which a main contact is coupled to the input and of which a first switch contact is coupled to the first data processing means via the first encoder memory means. The encoder also comprises the reduction means, coupled to the input, for reducing the received digital signal, the second data processing means, coupled to the reduction means, for generating a second coded digital signal, and the second encoder feedback means for feeding back at least a section of the second data processing means in order to make the coding proceed more efficiently. The second encoder feedback means comprise the second encoder memory means and are coupled to a second switch contact of the encoder switching means via the encoder prediction means.

Such a system, provided with first and second data processing means, is, as it were, made up of two layers: the first data processing means generate the first coded digital signal, which has the highest resolution because said signal is obtained by processing the received digital signal, and the second data processing means generate the second coded digital signal, which has the lowest resolution because said signal is obtained by processing the digital signal received by the reduction means. Both signals are then passed, by means of multiplexing and demultiplexing to the decoder, which is based on layered decoding and which, in the case of decoding based on higher resolution, uses both signals and which, in the case of decoding based on low resolution, uses only the second coded digital signal. The decoder comprises the first data reprocessing means for processing a first coded digital signal, the first decoder memory means, which are coupled to a first switch contact of the decoder switching means, of which a main contact is coupled to the first data reprocessing means, the second data reprocessing means for processing a second coded digital signal, and the second decoder memory means, which are coupled to the second data reprocessing means and, via decoder prediction means, to a second switch contact of the decoder switching means.

In this arrangement, the encoder switching means and the decoder switching means are designed as switch-over means, that is to say the main contact is connected through either to the first switch contact or to the second switch contact. If, in subordination to a "system controller", the main contact of the encoder switching means is connected through to the first switch contact, the preceding high-resolution picture stored in the first encoder memory means is used in order to predict the new high-resolution picture. If, in subordination to the "system controller", the main contact of the encoder switching means is connected through to the second switch contact, the instantaneous low-resolution picture is used in order to predict the new high-resolution picture. The information needed for this purpose and originating from the "system controller" is also passed to the decoder by means of multiplexing and demultiplexing so that the decoder switching means are in a synchronous state with the encoder switching means.

Such a known system has the disadvantage that it codes with inadequate efficiency.

B. SUMMARY OF THE INVENTION

The object of the invention is to provide a system of the type mentioned in the preamble which codes with increased efficiency.

For this purpose, the system according to the invention has the characteristic that the encoder switching means and the decoder switching means are each designed for the adjustment of a ratio of signals present at the first switch contact and second switch contact and for the combination of the signals adjusted in this way.

If the encoder switching means and the decoder switching means each adjust the ratio of the signals, present at the first switch contact and second switch contact, in subordination to the system controller and combine these adjusted signals, an improvement in the prediction of 3 dB is theoretically achieved with the correct ratio, which is, of course, picture-dependent, and thus resulting in an improvement of the coding efficiency.

The invention is based on the insight that the coding efficiency can generally be improved by basing the prediction oft he new high-resolution picture both on the preceding high-resolution picture (the signal present at the first switch contact) and on the instantaneous low-resolution picture (the signal present at the second switch contact), the adjustment of the ratio of the two signals having to be determined for each prediction.

A first embodiment of the system according to the invention has the characteristic that the encoder is provided with first encoder movement prediction means, situated in series with the first encoder memory means, and second encoder movement prediction means, situated in series with the second encoder memory means, the encoder being provided with first decoder movement compensation means, situated in series with the first decoder memory means, and second decoder movement compensation means, situated in series with the second decoder memory means.

As a result of installing, in the encoder, first encoder movement prediction means in series with the first encoder memory means and second encoder movement prediction means in series with the second encoder memory means and of installing, in the encoder, first decoder movement compensation means between the first switch contact and the first decoder memory means and of installing second decoder movement compensation means in series with the second decoder memory means, a system is obtained which codes with still higher efficiency because said system takes account of movements of the picture content in coding and decoding different picture elements. For this purpose, the encoder movement prediction means each generate vector signals which are passed, by means of multiplexing and demultiplexing, to the decoder, in which one of the vector signals or a combination of both vector signals is used to control the decoder movement compensation means.

A second embodiment of the system according to the invention has the characteristic that the encoder switching means and the decoder switching means are each designed for the multiplication of the signal present at the first switch contact by the value x and for the multiplication of the signal present at the second switch contact by the value $1-x$, where $0 \leq x \leq 1$.

Because the signals present at the first switch contact and second switch contact are digital and are presented in the form of numbers, both signals can be multiplied, in a manner which is simple for the person skilled in the art, by x and $1-x$ (where $0 \leq x \leq 1$), respectively, and then summed. Many variations on this are conceivable, such as the multiplication by y and $100-y$ (where $0 \leq y \leq 100$), respectively, and then division of the summed signal by the value 100, which ultimately yields, of course, the same result if $y = 100$ x. In this way, by adjusting the value of x in subordination to the system controller, it is possible to determine to what extent the preceding high-resolution picture and the present low-resolution picture contribute to the prediction of the new high-resolution picture.

The invention furthermore relates to an encoder for use in the system according to the invention, comprising an input for receiving the digital signal, first data processing means, coupled to the input, for generating a first coded digital signal, first encoder feedback means for feeding back at least a section of the first data processing means, which first encoder feedback means comprise encoder switching means, of which a main contact is coupled to the input and of which a first switch contact is coupled to the first data processing means via first encoder memory means, reduction means, coupled to the input, for reducing the received digital signal, second data processing means, coupled to the reduction means, for generating a second coded digital signal, and second encoder feedback means for feeding back at least a section of the second data processing means, which second encoder feedback means comprise second encoder memory means and, via encoder prediction means, are coupled to a second switch contact of the encoder switching means.

The encoder according to the invention has the characteristic that the encoder switching means are designed for adjusting a ratio of signals present at the first switch contact and second switch contact and for combining the signals adjusted in this way.

A first embodiment of the encoder according to the invention has the characteristic that the encoder is provided with first encoder movement prediction means, situated in series with the first encoder memory means, and second encoder movement prediction means, situated in series with the second encoder memory means.

A second embodiment of the encoder according to the invention has the characteristic that the encoder memory means are designed for the multiplication of the signal present at the first switch contact by the value x and for the multiplication of the signal present at the second switch contact by the value $1-x$, where $0 \leq x \leq 1$.

The invention furthermore relates to a decoder for use in the system according to the invention, comprising first data processing means for processing a first coded digital signal, first decoder memory means which are coupled to a first switch contact of decoder switching means, of which a main contact is coupled to the first data reprocessing means, second data processing means for processing a second coded digital signal, and second decoder memory means which are coupled to the second data reprocessing means and, via decoder prediction means, to a second switch contact of the decoder switching means.

The decoder according to the invention has the characteristic that the decoder switching means are designed for adjusting a ratio of signals present at the first switch contact and second switch contact and for combining the signals adjusted in this way.

A first embodiment of the decoder according to the invention has the characteristic that the decoder is provided with first decoder movement compensation means, situated in series with the first decoder memory means, and second decoder movement compensation means, situated in series with the second decoder memory means.

A second embodiment of the decoder according to the invention has the characteristic that the decoder switching means are designed for the multiplication of the signal present at the first switch contact by the value x and for the multiplication of the signal present at the second switch contact by the value $1-x$, where $0 \leq x \leq 1$.

C. REFERENCE

"Coded representation of picture and audio information", "TM1 Compatibility Experiments", by I. Parke, ISO-IEC/JTC1/SC29/WG11, MPEG92/291

D. BRIEF DESCRIPTION OF THE DRAWING

The invention will be explained in greater detail by reference to an exemplary embodiment shown in the figures. In the figures.

E. DETAILED DESCRIPTION

Figure 1:
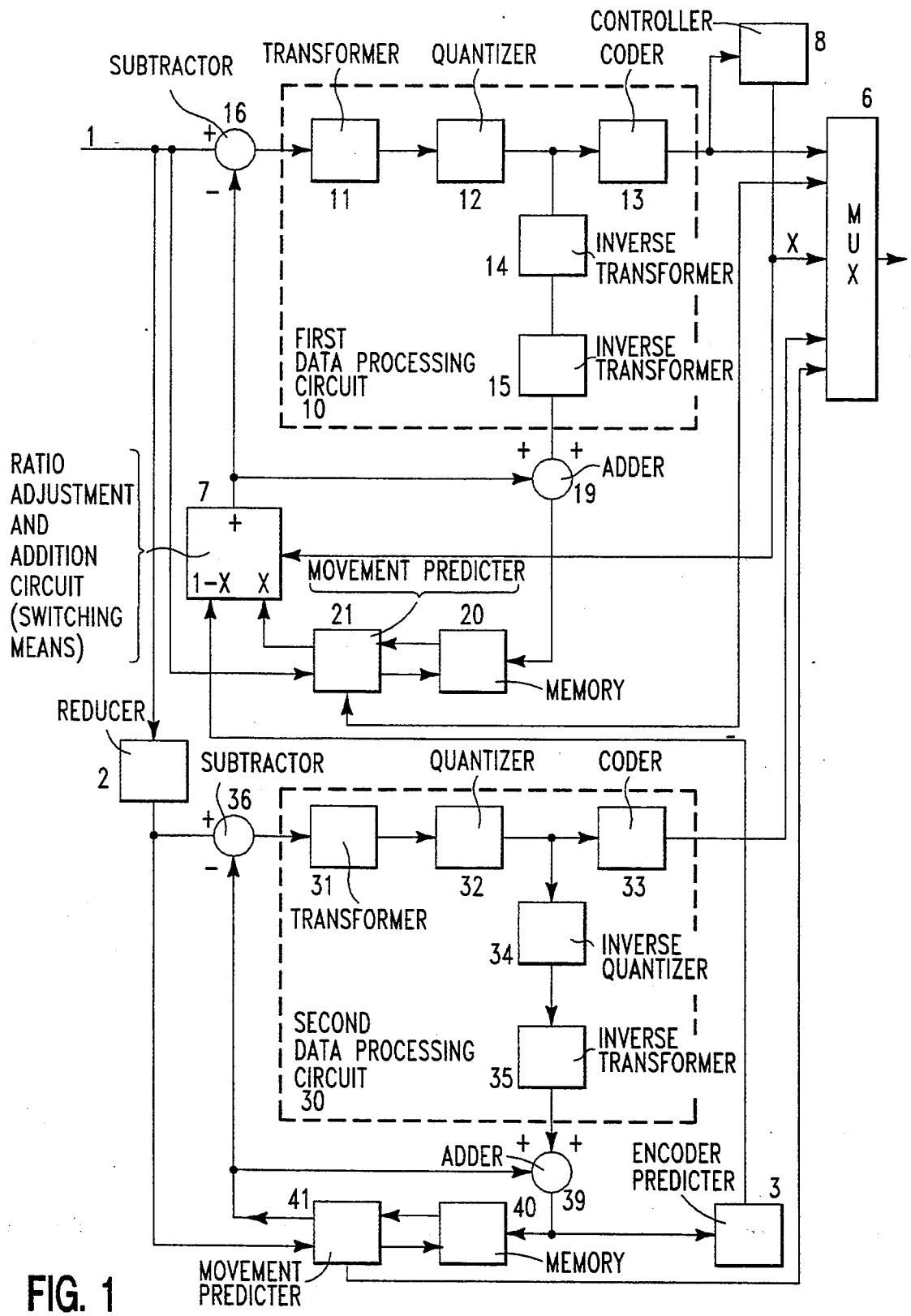
FIG. 1 shows an encoder according to the invention.

The encoder shown in FIG. 1 is made up of two layers. The first layer elements 10-21 codes signals on the basis of the highest resolution and the second layer elements 30-41 codes signals on the basis of the lowest resolution.

The first layer comprises first data processing means 10, which are made up of a series connection of transforming means 11, quantizing means 12 and coding means 13 and of a series connection, coupled to a branching point situated between the quantizing means 12 and coding means 13, of inverse quantizing means 14 and inverse transforming means 15. An input of transforming means 11 forms an input of data processing means 10, which is coupled to an output of subtraction circuit 16. An output of coding means 13 forms a coding output of data processing means 10 for generating a first coded digital signal on the basis of the high resolution, which coding output is coupled to a first input of a multiplexer 6. An output of inverse transforming means 15 forms a feedback output of data processing means 10 for the (at least partial) feedback of said data processing means 10, which feedback output is coupled to a first (plus) input of addition circuit 19. An output of addition circuit 19 is coupled to an input of first encoder memory means 20. The latter are bidirectionally coupled to a first encoder movement prediction means 21, of which a vector output for generating a first vector signal is coupled to a second input of multiplexer 6. An input of encoder movement prediction means 21 is coupled to an input 1 of the encoder, which input 1 is furthermore coupled to a first (plus) input of subtraction circuit 16. A second (minus) input of the latter is coupled to a second (plus) input of addition circuit 19 and to an output (a main contact) of encoder switching means 7, of which a first input (a first switch contact) is coupled to a further output of encoder movement prediction means 21. A control input of encoder switching means 7 is coupled to a fifth input of multiplexer 6 and to an output of a system controller 8, of which an input is coupled to the coding output of data processing means 10. The system controller 8 passes an x signal, which represents the value of x, to the encoder switching means 7 and to the multiplexer 6, which then passes the x signal in multiplexed form to the decoder. Encoder switching means 7 are designed to the adjustment of the ratio of the signals present at the first and second input by multiplying the signal present at the first input (originating from the first encoder movement prediction means 21) by the value x and by multiplying the signal present at the second input (originating from the encoder prediction means 3) by the value $1-x$ and by then adding the two signals obtained in this way. For the value x, it is the case that $0 \leq x \leq 1$, which value is determined by the system controller 8 in a manner to be considered latter and is adjusted via the control input of encoder switching means 7. The first encoder memory means 20 and the first encoder movement prediction means 21 together form the first encoder feedback means.

The second layer comprises second data processing means 30, which are made up of a series connection of transforming means 31, quantizing means 32 and coding means 33 and of a series connection, coupled to a branching point situated between the quantizing means 32 and coding means 33, of inverse quantizing means 34 and inverse transforming means 35. An input of transforming means 31 forms an input of data processing means 30, which is coupled to an output of subtraction circuit 36. An output of coding means 33 forms a coding output of data processing means 30 for generating a second coded digital signal based on the low resolution, which coding output is coupled to a third input of a multiplexer 6. An output of inverse transforming means 35 forms a feedback output of data processing means 30 for (at least partially) feeding back said data processing means 30, which feedback output is coupled to a first (plus) input of addition circuit 39. An output of addition circuit 39 is coupled to an input of second encoder memory means 40. The latter are coupled bidirectionally to second encoder movement prediction means 41, of which a vector output for generating a second vector signal is coupled to a fourth input of multiplexer 6. An input of encoder movement prediction means 41 is coupled to an output of reduction means 2 for reducing the received signal, which output is furthermore coupled to a first (plus) input of subtraction circuit 36. A second (minus) input of the latter is coupled to a further output of encoder movement prediction means 41, which further output is furthermore coupled to a second (plus) input of addition circuit 39. Reduction means 2, of which an input is coupled to the input 1 of the encoder, comprise filter means and subsample means. The output of addition circuit 39 is furthermore coupled to an input of encoder prediction means 3 for coupling data processing means 30 to data processing means 10. An output of encoder prediction means 3 is coupled to a second input (a second switch contact) of encoder switching means 7. Encoder prediction means 3 comprise interpolating means and upsample means. At the same time, the second encoder memory means 40 and the second encoder movement prediction means 41 together form the second encoder feedback means.

The operation of the encoder shown in FIG. 1 is as follows. The digital signal to be coded is presented to input 1 as bit stream, a predetermined number of bits forming a picture element (pixel or pel) in each case. Assuming that the encoder switching means are adjusted with $x = 1$ and that the content of the first encoder memory means 20 is blank, a first group of pels reaches the data processing means 10 via subtraction circuit 16. The transforming means 11 perform, for example, a discrete cosine transformation on the group of pels, which determines the associated coefficient for each frequency component. The quantizing means 12 quantize the signal obtained. The quantized signal is then coded by coding means 13, for example on the basis of a two-dimensional table with which new code words are generated which have on average a shorter length than the incoming words, and fed to multiplexer 6. This transformed, quantized and coded first group of pels consequently forms the first section of the signal coded on the basis of the high resolution. After having been transformed and quantized, the first group of pels is inversely quantized by inverse quantizing means 14 and inversely transformed by inverse transforming means 15 and stored in encoder memory means 20 at a first location via addition circuit 19. A second group of pels transverses the same route as the first group of pels, undergoes the same operation and is stored in encoder memory means 20 at a second location, etc. until all the groups of pels of one complete picture (the first picture) have been stored.

The first group of pels of the next (second) picture is then presented at input 1 and fed to encoder movement prediction means 21 which, on the basis of the preceding (first) picture stored in encoder memory means 20, investigate whether there is a possibility of a particular movement in the second picture. If this is so, said movement is fed in the form of a first vector signal to multiplexer 6. At the same time, encoder memory means 20 generate the first group of pels of the preceding (first) picture, which first group of pels is subtracted, via encoder movement prediction means 21 and via encoder switching means 7 (because the latter are adjusted with $x=1$) from the first group of pels of the (second) picture to be coded by means of subtraction circuit 16. Because the difference between the first group of pels of the second picture and the first group of pels of the first picture is then presented to data processing means 10, the coding proceeds appreciably more efficiently. Taking account of any movements in the picture content of subsequent pictures by means of the encoder movement prediction means increases the efficiency by a further additional amount. Instead of vectors, other prediction parameters which have been determined on the basis of other prediction methods can, of course, also be transmitted.

What has been described above is the operation of the encoder as regards the first layer, which is constructed around data processing means 10, the encoder switching means being adjusted with $x=1$. The operation as regards the second layer constructed around data processing means 30 is in principle identical (given the adjustment $x=1$), with the exception of the following. Data processing means 30 receive, via subtraction circuit 36, the received signal which has been reduced by reduction means 2 and which has a lower resolution that the signal presented at input 1, as a consequence of the filtering and subsampling. The coded signal generated by data processing means 30 is consequently coded on the basis of a lower resolution (the low resolution).

If the encoder switching means are adjusted with $x=1$, the first group of pels of the preceding (first) picture is subtracted from the first group of pels of the (second) picture to be coded by means of subtraction circuit 16. As a result, a section of the stored preceding high resolution picture is used to predict a section of the new high-resolution picture to be coded. If the section of the stored preceding high-resolution picture is only slightly similar to, or not similar to, the corresponding section of the new high-resolution picture to be coded, it may be decided to base the prediction on a portion of the new low-resolution picture. In this case, the encoder switching means should be adjusted with $x=0$. If the efficiency of the data processing means was increased in the case where $x=1$ because the difference between the first group of pels of the second picture and the first group of pels of the first picture only needed to be coded, in the case where $x=0$, the efficiency of the data processing means 10 is also increased because, as a consequence of coupling the second layer to the first layer by encoder prediction means 3, a group, coarsely coded in the second layer, of pels in the first layer only has to be coded in a more refined manner. The interpolating and upsampling by encoder prediction means 3 is necessary because of the different resolution levels between the two layers.

Both types of predictions are combined if a value between 0 and 1 is chosen for x. If $x=\frac{1}{2}$, both types of predictions weigh equally heavily. If $x<\frac{1}{2}$, the prediction on the basis of the instantaneous low-resolution picture weighs more heavily, and if $x>\frac{1}{2}$, the prediction on the basis of the previous high-resolution picture weighs more heavily. With a correctly chosen value of x, if is found that a 3 dB gain in the prediction can be achieved. The optimum value of x is determined by the system controller 8, which investigates, for example, for every possible value of x how many bits are needed at the coding output of data processing means 10 to reproduce a coded section of a picture. The value of x which requires the minimum number of bits in this case forms the optimum value. The input of the system controller 8 could also be coupled to the output of the subtraction circuit 16, in which case the square of the result signal (difference signal or error signal) present at that output should be calculated for every value of x. The value of x which yields the smallest error then forms the optimum value.

The encoder should comprise a minimum of two layers, in which case the coded signal having the high resolution is suitable, for example, for reproducing so-called high-definition television pictures and the coded signal having the low resolution is suitable for reproducing normal television pictures. If the encoder comprises three layers, signals could be coded with the third layer for the reproduction of, for example, pictures of a so-called video telephone, in which case a yet lower resolution may suffice.

Figure 2:
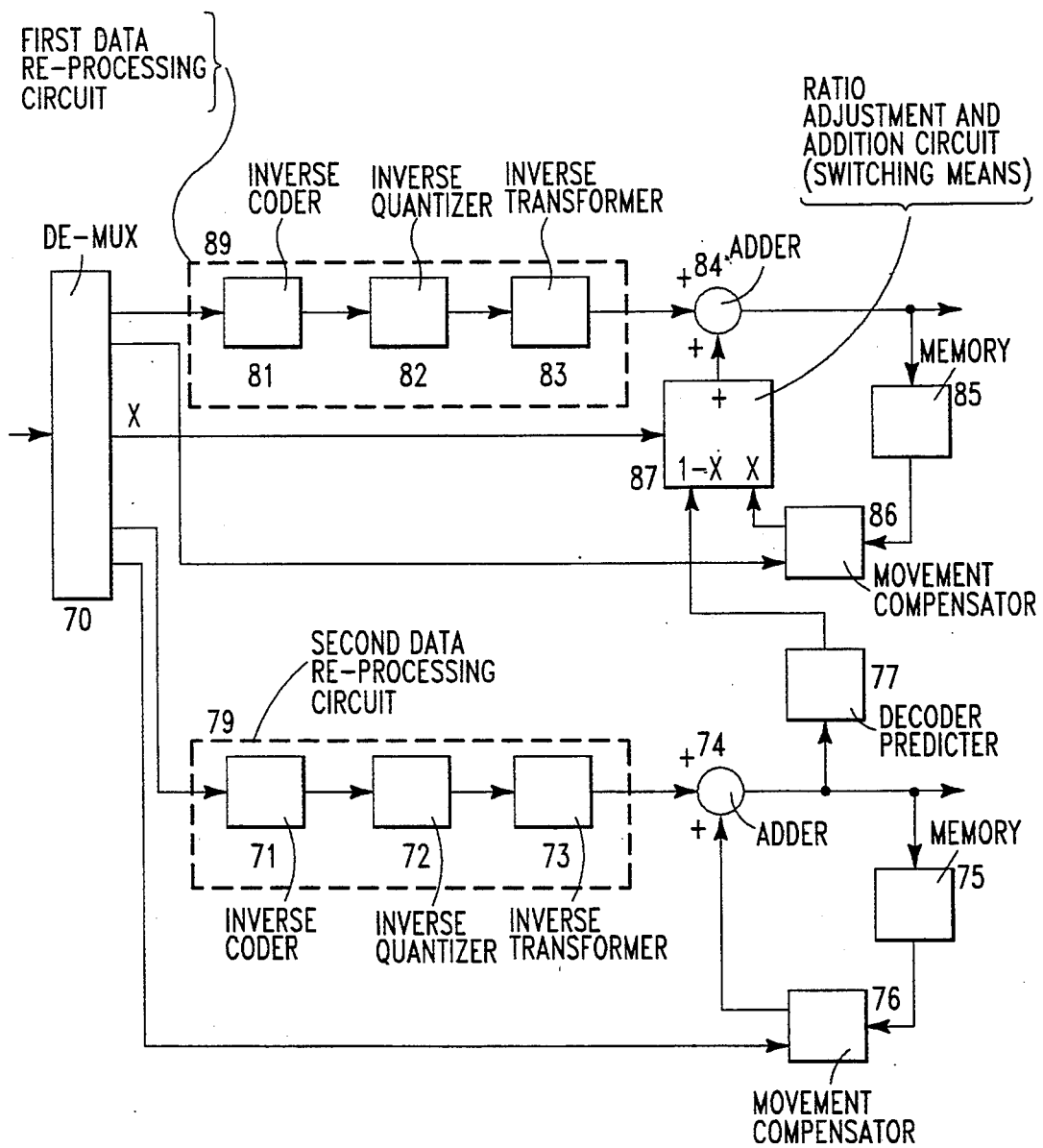
FIG. 2 shows a decoder according to the invention.

The decoder shown in FIG. 2 comprises a demultiplexer (DE-MUX) 70 with an input for receiving the multiplexed signal which originates from the encoder and which comprises the first coded digital signal, having the highest resolution, the first vector signal, the second coded digital signal, having the lowest resolution, the second vector signal and the x signal. At a first output of the demultiplexer 70 there appears the first coded digital signal, at a second output of the demultiplexer 70 there appears the first vector signal, at a third output of the demultiplexer 70 there appears the second coded digital signal, at a fourth output of the demultiplexer 70 there appears the second vector signal, and at a fifth output of the demultiplexer 70 there appears the x signal. The first output of the demultiplexer 70 is coupled to an input of first data reprocessing means 89, which comprise a series connection of inverse coding means 81, inverse quantizing means 82 and inverse transforming means 83, and of which an output is coupled to a first input of addition circuit 84. An output of addition circuit 84 forms a first (high-resolution) output of the decoder and is coupled to an input of first decoder memory means 85, and an output of the latter is coupled to an input of first decoder movement compensation means 86. A vector input of the latter is coupled to the second output of the demultiplexer 70 for the reception of the (first) vector signal and an output is coupled to a first input (a first switch contact) of decoder switching means 87, of which an output is coupled to a second input of addition circuit 84. A control input of decoder switching means 87 is coupled to the fifth output of demultiplexer 70 for the reception of the x signal.

The third output of the demultiplexer 70 is coupled with an input of the second data reprocessing means 79, which comprises a series connection of inverse coding means 71, inverse quantizing means 72 and inverse transforming means 73. An output of the latter is coupled to a first input of addition circuit 74, of which an output is coupled to a second input (a second switch contact) of decoder switching means 87 via decoder prediction means 77, which comprise interpolating means and upsample means. The output of addition circuit 74, which forms a second (low-resolution) output of the decoder, is also coupled to an input of second decoder memory means 75, and an output of the latter is coupled to an input of second decoder movement compensation means 76. An output of the latter is coupled to a second input of addition circuit 74 and a vector input is coupled to the fourth output of demultiplexer 70 for the reception of the (second) vector signal.

The operation of the decoder shown in FIG. 2 is as follows. First data reprocessing means 89 perform, by means of inverse coding means 81, an inverse coding on the first coded digital signal, for example on the basis of a table, then perform an inverse quantization by means of inverse quantizing means 82 and then perform, by means of inverse transforming means 83, an inverse transformation, for example an inverse discrete cosine transformation. Second data processing means 79 perform, by means of inverse coding means 71, an inverse coding on the second coded digital signal, for example on the basis of a table, then perform an inverse quantization by means of inverse quantizing means 72 and then perform, by means of inverse transforming means 73, an inverse transformation, for example an inverse discrete cosine transformation. The signal generated by second data processing means 79 has the low resolution and forms the difference between a particular group of pels of a particular picture and a particular group of pels of a picture prior thereto. With the aid of addition circuit 74, second decoder memory means 75 and second decoder movement compensation means 76, the particular group of pels of the particular picture then appears at the second (low-resolution) output of the decoder. This signal is interpolated and upsampled with the aid of decoder prediction means 77, after which is it suitable for feeding to the second input of decoder switching means 87.

The signal generated by first data processing means 89 has the high resolution and forms the difference between a particular group of pels of a particular picture and a particular group of pels of a picture prior thereto. With the aid of addition circuit 84, first decoder memory means 85, first decoder movement compensation means 86 and decoder switching means 87, the particular group of pels of the particular picture then appears at the first (high-resolution) output of the decoder.

Decoder switching means 87 receive the x signal via the fifth output of demultiplexer 70, as a result of which the decoder switching means 87 and the encoder switching means 7 are in the same state (read: have been adjusted with the same value of x), and this is necessary, of course, for a good decoding.

The decoder comprises a minimum of one layer containing (the second) data reprocessing means if decoding is to be done at the lowest level, and two layers (each layer containing data reprocessing means) if decoding is to be done at a higher level, etc. If the decoder comprises as many layers as the encoder, decoding can be carried out at the highest level. It is, of course, also possible, optionally, to decode at the lowest level or at a higher level with a decoder which is made up of various layers, and this can be achieved by making and/or breaking particular connections in the decoder by means of switches, in which case decoder switching means 87 have to be adjusted in a suitable manner (possibly with a value of x other than that with which the encoder switching means 7 have been adjusted).

The use of multiplexer 6 and demultiplexer 70 is, of course, only one embodiment. Thus, for example, it is conceivable in video recorders that the transfer of the signals from the encoder to the decoder takes place via normal invidual connections and there are, furthermore, methods other than multiplexing and demultiplexing with which different signals can also be transferred (such as modulation and demodulation techniques). Furthermore, separate multiplexers could be used for each layer in the encoder and separate demultiplexers for each layer in the decoder.

We claim:

1. An encoder for coding a digital signal, comprising:
   an encoder-input for receiving the digital signal;
   first data processing means, of which an input is coupled to the encoder-input, for generating a first coded digital signal at a first output of the first data processing means;
   first encoder feedback means having encoder switching means, of which an output of the encoder switching means is coupled to the input of the first data processing means and of which a first input to the encoder switching means is coupled, via a first encoder memory, to a second output of the first data processing means;
   reduction means, coupled to the encoder-input, for reducing the received digital signal;
   second data processing means, of which an input is coupled to an output of the reduction means, for generating a second coded digital signal at a first output of the second data processing means; and
   second encoder feedback means having a second encoder memory, of which an output of said second encoder memory is coupled to the input of the second data processing means and an input to the second encoder memory is coupled to a second output of the second data processing means, an output of the second encoder feedback means being coupled, via an encoder predictor, to a second input of the encoder switching means;
   wherein the encoder switching means adjusts a ratio of signals present at the first and second inputs to the encoder switching means so as to yield adjusted signals and combines the adjusted signals to form a combined signal and applies the combined signal to the output of the encoder switching means.

2. The encoder according to claim 1 wherein the encoder switching means multiples the signal present at the first input to the encoder switching means by a value x and multiplies the signal present at the second input to the encoder switching means by a value $1-x$, where $0 \leq x \leq 1$, so as to generate the adjusted signals.

3. The encoder according to claim 1 wherein the first encoder feedback means further comprises a first encoder movement predictor situated between the first input of the encoder switching means and the first encoder memory, and the second encoder feedback means further comprises a second encoder movement predictor situated in series with the second encoder memory.

4. The encoder according to claim 3 wherein the encoder switching means multiplies the signal present at the first input to the encoder switching means by a value x and multiplies the signal present at the second input to the encoder switching means by a value $1-x$, where $0 \leq x \leq 1$, so as to generate the adjusted signals.

5. A decoder for decoding a coded digital signal, comprising:
first data reprocessing means for processing a first coded digital signal;
a first decoder memory of which an output is coupled to a first input of decoder switching means, an output of the decoder switching means being coupled to the first data reprocessing means;
second data reprocessing means for processing a second coded digital signal; and
a second decoder memory wherein an input of which is coupled to an output of the second data reprocessing means, the output of the second data reprocessing means also being coupled, via a decoder predictor, to a second input of the decoder switching means, and an output of said second decoder memory being coupled to an input of the second data reprocessing means;
wherein the decoder switching means adjusts a ratio of signals present at the first and second inputs to the decoder switching means to generate adjusted signals and combines the adjusted signals to form a combined signal and applies the combined signal to the output of the decoder switching means.

6. The decoder according to claim 5 wherein the decoder switching means multiplies the signal present at the first input to the decoder switching means by a value x and multiplies the signal present at the second input to the decoder switching means by a value $1-x$, wherein $0 \leq x \leq 1$, so as to generate the adjusted signals.

7. The decoder according to claim 5 further comprising:
a first decoder movement compensator situated in series with the first decoder memory; and
a second decoder movement compensator situated in series with the second decoder memory.

8. The decoder according to claim 7 wherein the decoder switching means multiplies the signal present at the first input to the decoder switching means by a value x and multiplies the signal present at the second input to the decoder switching means by a value $1-x$, wherein $0 \leq x \leq 1$, so as to generate the adjusted signals.

9. A system for communicating a digital signal comprising:
an encoder for coding the digital signal, the encoder comprising:
an encoder-input for receiving the digital signal;
first data processing means, of which an input is coupled to the encoder-input, for generating a first coded digital signal at a first output of the first data processing means;
first encoder feedback means having encoder switching means, of which an output of the encoder switching means is coupled to the input of the first data processing means and of which a first input to the encoder switching means is coupled, via a first encoder memory, to a second output of the first data processing means;
reduction means, coupled to the encoder-input, for reducing the received digital signal;
second data processing means, of which an input is coupled to an output of the reduction means, for generating a second coded digital signal at a first output of the second data processing means; and
second encoder feedback means having a second encoder memory, of which an output of said second encoder memory is coupled to the input of the second data processing means and an input to the second encoder memory is coupled to a second output of the second data processing means, an output of the second encoder feedback means being coupled, via an encoder predictor, to a second input of the encoder switching means;
a decoder for decoding the first and second coded digital signals into first and second decoded output digital signals, the decoder comprising:
first data reprocessing means for processing the first coded digital signal;
a first decoder memory of which an output is coupled to a first input of decoder switching means, an output of the decoder switching means being coupled to the first data reprocessing means;
second data reprocessing means for processing the second coded digital signal; and
a second decoder memory wherein an input of which is coupled to an output of the second data reprocessing means, the output of the second data reprocessing means also being coupled, via a decoder predictor, to a second input of the decoder switching means, and an output of said second decoder memory being coupled to an input of the second data reprocessing means; the inputs to said first and second decoder memories being the first and second decoded output digital signals, respectively;
wherein the encoder switching means and decoder switching means each adjusts a ratio of signals present at the first and second inputs to the encoder switching means and the decoder switching means, respectively, so as to yield corresponding pairs of adjusted signals and combines a corresponding one of the pairs of the adjusted signals to form a corresponding combined signal and applies the corresponding combined signal to the output of the corresponding encoder switching means or the decoder switching means.

10. The system according to claim 9 wherein the encoder switching means multiplies the signal present at the first input to the encoder switching means by a value x and multiplies the signal present at the second input to the encoder switching means by a value $1-x$, where $0 \leq x \leq 1$, so as to generate a corresponding one of the pairs of the adjusted signal.

11. The system according to claim 9 wherein the first encoder feedback means further comprises a first encoder movement predictor situated between the first input of the encoder switching means and the first encoder memory, and the second encoder feedback means further comprises a second encoder movement predictor situated in series with the second encoder memory.

12. The system according to claim 11 wherein the encoder switching means multiplies the signal present at the first input to the encoder switching means by a value x and multiplies the signal present at the second input to the encoder switching means by a value $1-x$, where $0 \leq x \leq 1$, so as to generate a corresponding one of the pairs of the adjusted signals.

13. The system according to claim 9 wherein the decoder switching means multiplies the signal present at the first input to the decoder switching means by a value x and multiplies the signal present at the second input to the decoder switching means by a value $1-x$, wherein $0 \leq x \leq 1$, so as to generate a corresponding one of the pairs of the adjusted signals.

14. The system according to claim 9 further comprising:
   a first decoder movement compensator situated in series with the first decoder memory; and
   a second decoder movement compensator situated in series with the second decoder memory.

15. The system according to claim 14 wherein the decoder switching means multiplies the signal present at the first input to the decoder switching means by a value x and multiplies the signal present at the second input to the decoder switching means by a value $1-x$, wherein $0 \leq x \leq 1$, so as to generate a corresponding one of the pairs of adjusted signals.

* * * * *